United States Patent [19]

Engwert

[11] Patent Number: 4,518,095
[45] Date of Patent: May 21, 1985

[54] DOOR ASSEMBLY

[75] Inventor: Gerald H. Engwert, Toledo, Ohio
[73] Assignee: Fresh Tech, Inc., Grand Rapids, Ohio
[21] Appl. No.: 616,130
[22] Filed: Jun. 1, 1984
[51] Int. Cl.³ .............................................. B65D 43/14
[52] U.S. Cl. .................................. 220/260; 220/211; 220/1 T; 49/199; 49/205; 49/340
[58] Field of Search ............... 220/260, 262, 211, 1 T, 220/1 V; 49/197, 199, 200, 203, 204, 205, 248, 246, 255, 340

[56] References Cited

U.S. PATENT DOCUMENTS

| | | | |
|---|---|---|---|
| 2,551,239 | 5/1951 | Bond | 49/340 X |
| 2,639,601 | 5/1953 | Miller | 220/211 X |
| 2,867,329 | 1/1959 | Miller | 49/340 X |
| 3,540,618 | 11/1970 | Lildal | 220/211 |
| 3,773,311 | 11/1973 | Poe et al. | 49/205 X |
| 4,119,238 | 10/1978 | Ja'afar et al. | 220/211 |
| 4,334,633 | 6/1982 | Piegza | 49/199 X |

Primary Examiner—Steven M. Pollard
Attorney, Agent, or Firm—David D. Murray

[57] ABSTRACT

A door assembly for providing access to a chamber for processing food products includes a door supported at its midpoint and pivoted about a first axis. A pair of crank arms receive and support the door on the axis and are pivotally secured to the sidewalls of the chamber along a second axis parallel to the first axis. The opposite ends of the crank arms are secured together by a bar or beam preferably disposed along a third axis parallel to the first axis of pivot. A hydraulic cylinder extends between the beam and a pivoted support disposed on the top portion of the chamber. A pair of strut assemblies are pivotally secured to the door generally above the first axis and extend generally toward the second axis where they are likewise pivotally secured. Pivotal disposition of the door at four points on a pair of parallel axes ensures that all door motion is controlled and further provides a compact opening arc which permits placement of the chamber and door proximate loading docks and similar structures.

19 Claims, 5 Drawing Figures

DOOR ASSEMBLY

BACKGROUND OF THE INVENTION

The invention relates generally to doors for permitting access to an enclosed space and, more specifically, to a door pivoted about a horizontal axis and associated mechanism which provides access to the interior of a chamber.

Since doors are simple structures with commonly accepted features and functions, they are oftentimes taken for granted. At the same time, however, they are highly sophisticated and adapted to their individual purpose. One such set of sophisticated constraints and requirements relates to doors for vacuum processing of produce. In such equipment, it is necessary that a door open and move away completely from the end of a vacuum chamber providing substantially complete and unhindered access into the interior of the chamber. Such doors are typically relatively massive inasmuch as they must withstand reduced internal pressure on the order of 5 millimeters of mercury. The necessary movement of such a door therefore presents certain challenges. Furthermore, it is preferable that such doors, while in their open positions, or moving between open and closed positions, do not interfere with adjacent structures such as loading docks, roofs and the like.

One such conventional vacuum cooler door is a vertical gate type wherein a door having an area and configuration comparable to the cross section of the vacuum chamber is disposed upon and translatable within a pair of parallel, vertically disposed tracks having a length approximately twice the height of the vacuum chamber. Such a door is especially suitable to vacuum chambers having a square cross section since it permits ready access to the entire end of the vacuum chamber when moved vertically upward a distance equal to its height. A major drawback of this design, however, is that it requires significant overhead clearance equal to approximately twice the height of the vacuum chamber. This requirement may necessitate modification to building ceilings in order to accommodate the significant vertical height of such a mechanism. Furthermore, this configuration does not lend itself to portable vacuum chambers since, again, the vertical door tracks will extend above the vacuum chamber a distance approximately equal to its own height.

Another design which minimizes certain problems of the above-described gate type door, comprehends a door which is pivotally secured to and supported along its horizontal midpoint axis by the ends of a pair of first class levers having their center pivots secured to the sides of the vacuum chamber. A pair of linear actuators such as hydraulic cylinders are pivotally secured to the other ends of the lever arms. The upper, central portion of the door is constrained for limited movement along a generally horizontal axis. So constrained, the action of the lever arms lifts the door upwardly and away from the end of the vacuum chamber thereby providing access thereto. Generally speaking, a vacuum cooler having a door of this design is more readily portable inasmuch as difficulties attendant the vertical height of the gate door trucks are eliminated. However, the lever arm and operator mechanism disposed on each side of the chamber effects a width limitation on the chamber if the apparatus is to meet federal and state vehicle width restrictions.

The utilization of a pair of hydraulic cylinders may also pose difficulties. First of all, if the cylinders are operating off equal hydraulic pressure, any binding or uneven load on the door will result in uneven travel thereof. Such skewing may compound binding of the pivots and bearings and damage to the door opening mechanism may result. A somewhat related problem can develop if any intermittent binding or external force excites the door into simple harmonic motion at its resonant frequency. In a dual cylinder configuration, such resonant motion of the door may induce a sympathetically alternating flow of hydraulic fluid between the two cylinders. Since there is negligible hydraulic damping, or damping from any other source for that matter, the most expeditious fashion in which to eliminate such resonant harmonic motion is to terminate the opening or closing cycle until such motion dies away and then continue the opening or closing cycle. Such interruptions are, of course, annoying and time consuming but, the alternative, of not terminating motion of the door, is even less desirable since it may cause damage to the door and operator mechanism.

Finally, though motion of the upper portion of the door is constrained along a horizontal axis between two finite limits, motion between such limits is unrestricted and usually occurs suddenly. Though such sudden motion may well be anticipated by the operator of the door, it may surprise others and deleteriously affect the life of the door opening mechanism and supporting chamber structure.

From the foregoing, it is apparent that improvements in the art and design of vacuum cooler doors and door opening assemblies are both possible and desirable.

SUMMARY OF THE INVENTION

A door assembly for providing full width and height access to the interior of a chamber which may be utilized for processing by vacuum cooling food products and for similar purposes comprehends a unitary door supported about a first horizontal axis. A pair of crank arms are pivotally secured to the door about the first axis and extend in parallel along the walls of the chamber to support structures having bearings which receive the crank arms and permit pivoting motion about a second horizontal axis parallel to the first axis. The opposite ends of the crank arms extend away from the bearings and support structures and are secured together along a third parallel, horizontal axis by a fixed rod or beam. Disposed between the termini of the crank arms on such elongate beam is a clevis which is in turn pivotally secured to a piston of a piston and cylinder assembly. The cylinder of the assembly is pivotally secured to the upper portion of the chamber wall. A pair of strut assemblies which are preferably spring loaded are pivotally secured to the door at points common to a fourth horizontal axis parallel to and disposed above the first horizontal axis when the door is in its closed position. The opposite ends of the strut assemblies are likewise pivotally secured to the chamber walls at a pair of points common to a fifth horizontal and parallel axis.

DESCRIPTION OF THE PREFERRED EMBODIMENT

Figure 1:
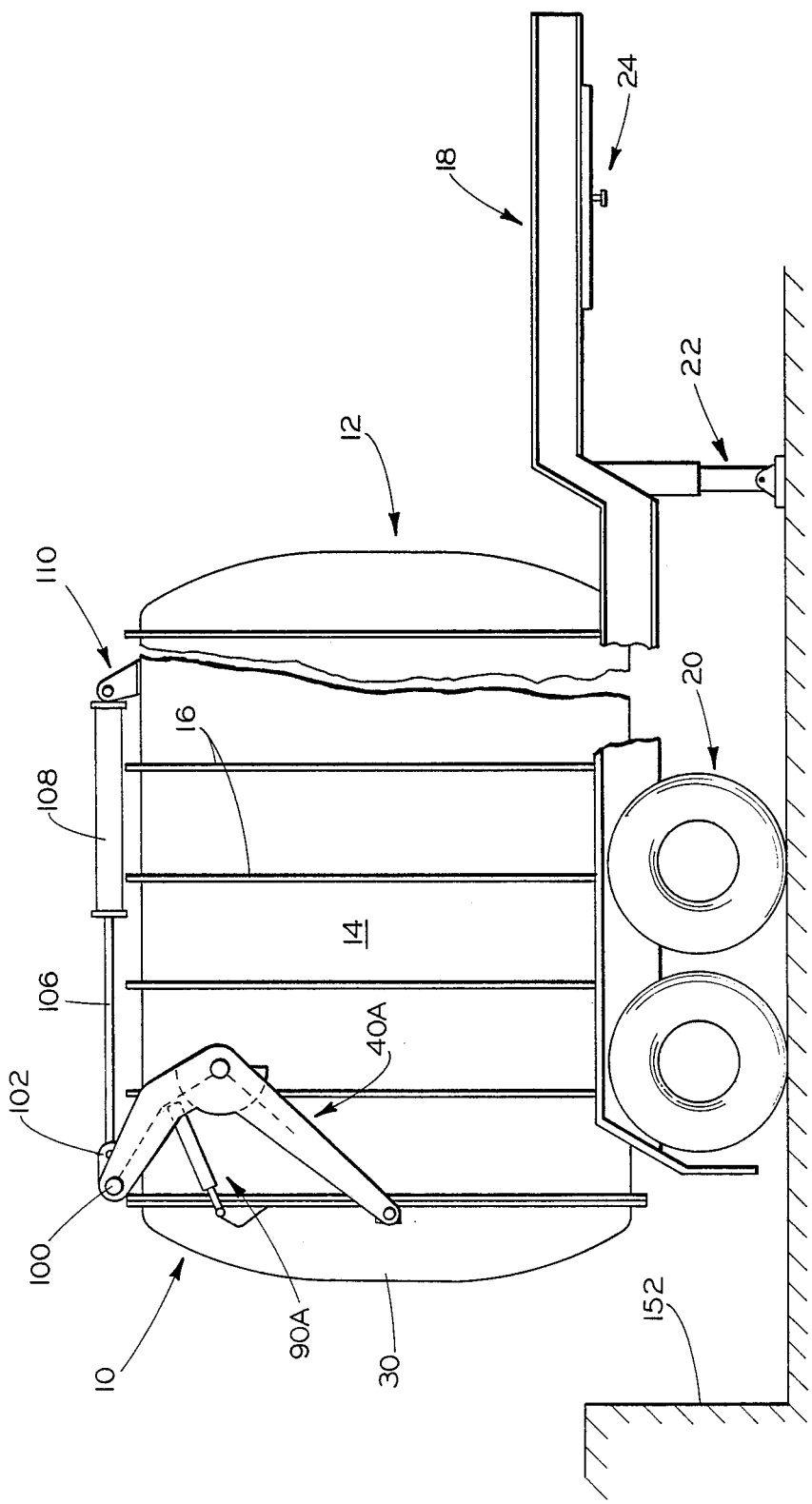
FIG. 1 is a side elevational view of a vacuum cooler door assembly according to the instant invention.

Referring now to FIG. 1, a door assembly for utilization with chambers such as a vacuum cooling chamber is illustrated and generally designated by the reference numeral 10. The door assembly 10 is illustrated in its closed position and, so positioned, extends across and sealingly closes one end of a structure such as a vacuum chamber assembly 12. The vacuum chamber assembly 12 includes elongate walls 14 which may be circular, oval, rectangular or square in cross section. Reinforcing ribs 16 may be secured about the periphery of the walls 14 to provide increased strength if desired. The vacuum chamber assembly 12 may be supported on a substantially conventional trailer assembly 18 having wheel and axle assemblies 20, landing gear 22 and a king pin 24 to render it transportable from site to site as will be readily appreciated. Optionally, the trailer assembly 18 may be replaced by any stationary, suitable support structure if there is no necessity or requirement of portability of the vacuum chamber assembly 12. Typically, on the forward portion of the trailer assembly 18, above the king pin 24, will be located refrigeration and control apparatus associated with the vacuum chamber assembly 12. Inasmuch as such equipment forms no portion of the instant invention, it will not be further discussed.

Figure 2:
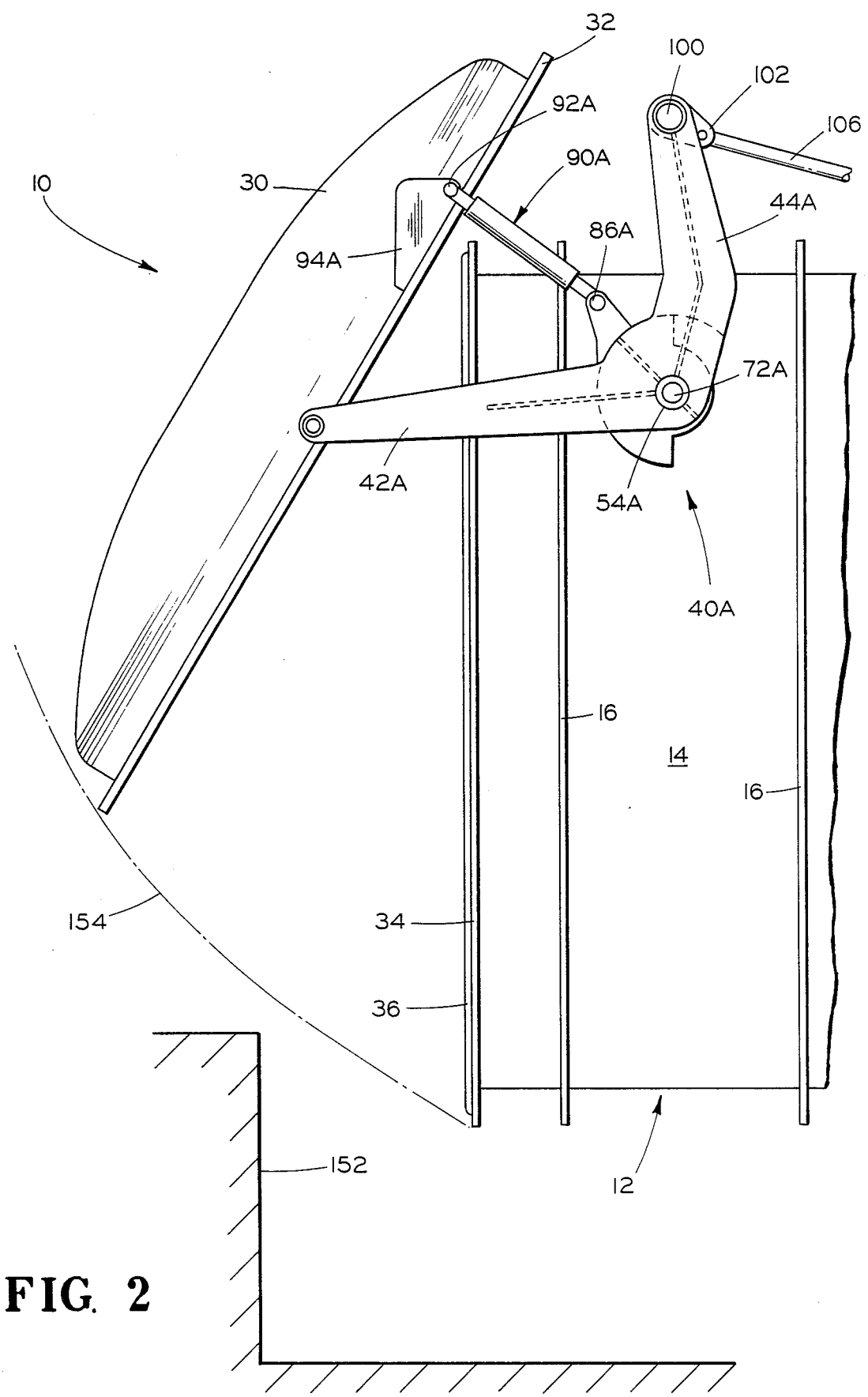
FIG. 2 is an enlarged, fragmentary, side elevational view of a vacuum cooler door assembly according to the instant invention.

Referring now to FIGS. 1 and 2, the door assembly 10 is seen to include a door 30 having a generally convex profile and a peripheral shape which conforms to that of the walls 14 of the vacuum chamber assembly 12. The door 30 includes a generally radially directed peripheral flange 32 which seals against a complementarily disposed flange 34 disposed at the end of the chamber assembly 12. Appropriate elastomeric seals 36 or similar structures may be utilized, as necessary, to provide an air tight seal to the chamber 12 during initial evacuation. Upon establishment of a slight pressure differential, the door 30 will be tightly forced closed. Should the door assembly 10 be utilized in conjunction with a pressurized chamber, additional clamping means such as captive C-clamps (not illustrated) and the like may be utilized as those familiar with such pressure sealing means will readily appreciate.

Figure 3:
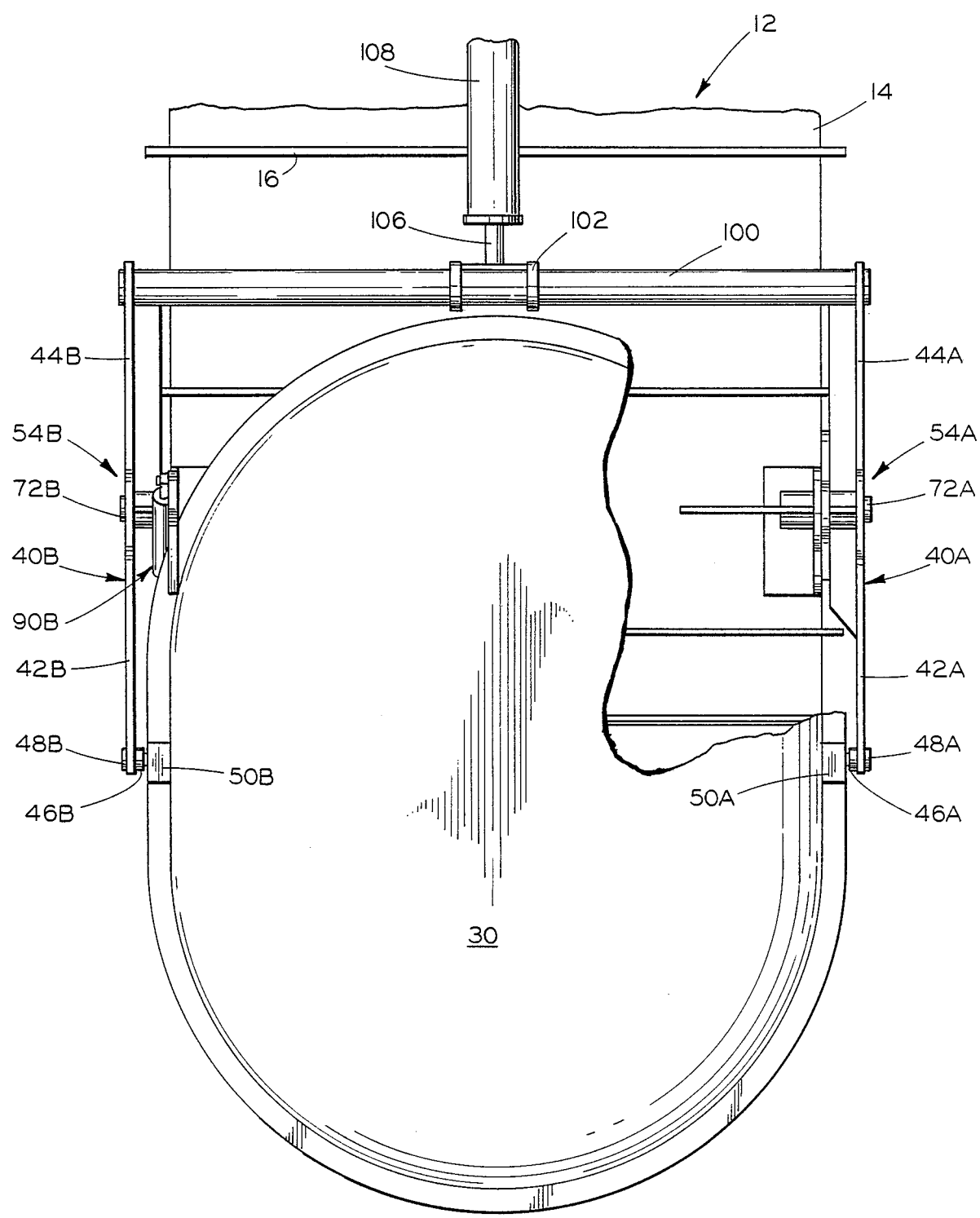
FIG. 3 is a fragmentary, top plan view of a portion of a vacuum cooler with a door assembly according to the instant invention in the fully open position.

Referring now to FIGS. 1, 2 and 3, the door assembly 10 is also seen to include a pair of bell type crank arm assemblies 40A and 40B. The first crank arm assembly 40A includes a first arm 42A extending generally toward the rear of the vacuum chamber assembly 12 and a second arm 44B extending generally upwardly and at approximately a right angle to the first arm 42A. Likewise, the crank arm assembly 40B includes a first arm 42B extending to the rear of the vacuum chamber assembly 12 and a second arm 44B extending generally upwardly at approximately a right angle to the first arm 42B. The termini of the first arms 42A and 42B are pivotally secured to the door 30 by a respective pair of pivot pins 48A and 48B which extend through appropriately sized apertures (not illustrated) defined by the bushings 46A and 46B of the arms 42A and 42B and are fixedly received within suitable mounting structures such as support blocks 50A and 50B, respectively, which are in turn secured by welding or other suitable means to the peripheral flange 32 of the door 30. The pivot pins 48A and 48B define a first axis about which the door 30 may be moved as will be more fully described subsequently. In the medial portion of the crank arms 40A and 40B and generally at the intersection of the respective pair of first and second arms 42A and 44A and 42B and 44B is disposed a respective right and left pivot and bearing assembly 54A and 54B. The bearing assemblies 54A and 54B are identical but for the right and left sense and thus only one of the assemblies, namely, the right hand pivot and bearing assembly 54A will be described.

Figure 4:
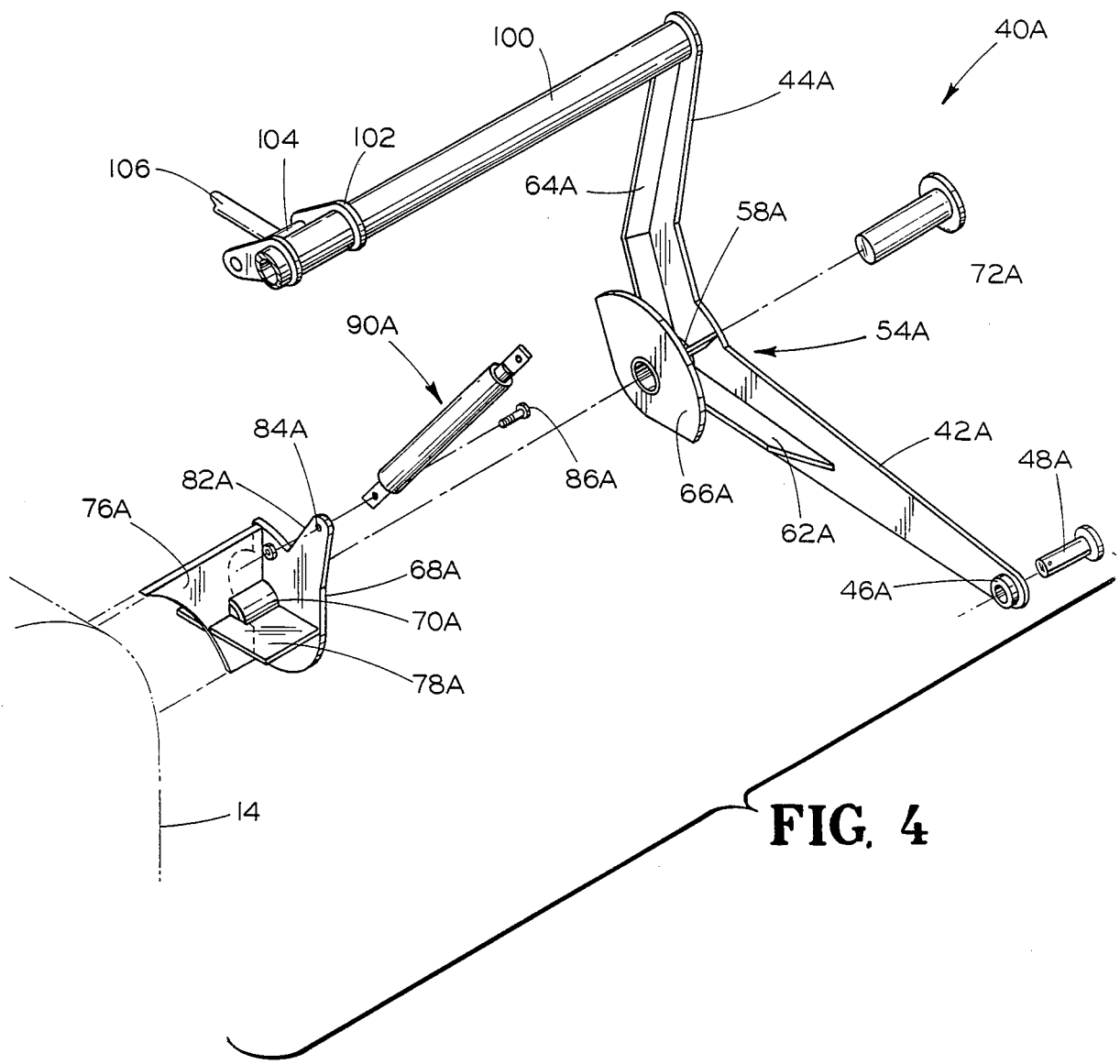
FIG. 4 is an exploded perspective view of a vacuum cooler door crank and bearing assembly according to the instant invention.

With reference now to FIGS. 2, 3 and 4, it will be appreciated that the right pivot and bearing assembly 54A includes a centrally disposed bushing 58A secured to and extending normal to the plane of the crank arm assembly 40A. The strength and rigidity of the bushing 58A as well as the crank arms 42A and 44A are improved by generally radially extending struts 62A and 64A which extend away from the bushing 58A in planes normal to the plane of the crank arm assembly 40A. A first thrust bearing plate 66A is secured about the bushing 54A and to the elongate edges of the struts 62A and 64A remote from the arms 42A and 44A in a plane parallel to the crank arm assembly 40A. The first thrust bearing plate 66A may have an irregular profile, partially circular and partially chordal as illustrated, or other peripheral shape, as desired. It should, however, define significant radially extending surface at a significant distance from the axis of pivot defined by the bushing 58A in order to minimize torquing and twisting, i.e., any motion other than rotational motion about the axis defined by the bearing 58A, by the crank arm assembly 40A. The first thrust bearing plate 66A is disposed adjacent and in intimate contact with a second thrust bearing plate 68A. Generally, centrally disposed on the thrust bearing plate 68A and secured thereto is a bushing 70A which aligns with the bushing 58A of the crank arm assembly 40A and receives a captive pivot pin 72A which extends through the bushing 58A. The second thrust bearing plate 68A and bushing 70A are secured to the wall 14 of the chamber 12 by suitable structures such as a pair of intersecting support plates 76A and 78A. It will be appreciated that the preferable material from which the foregoing components are fabricated is steel and that such assembly and securement is most preferably accomplished by welding.

The second thrust bearing plate 68A also includes a radially outwardly extending lug 82A having a through aperture 84A disposed therein adjacent its terminus. The axis of the through opening 84A is disposed parallel to the axis of the pivot pin 72A as well as the bushings 58A and 78A and receives a pivot pin such as a threaded fastener 86A which pivotally secures one end of a strut assembly 90A thereto. The opposite end of the strut assembly 90A is likewise pivotally secured by a threaded fastener 92A or similar device to a planar mounting plate 94A which is in turn secured to the peripheral flange 32 of the door 30. The axis of the threaded fastener 92A is parallel to that of the pivot pin 72A and threaded fastener 86A. The construction and function of the strut assembly 90A will be described subsequently.

Adjacent the termini of the crank arms 44A and 44B and extending fixedly therebetween is a transversely disposed tube or beam 100. The beam 100 securely interconnects the termini of the arms 44A and 44B of the crank arm assemblies 40A and 40B and ensures their even and unified motion about the axis of pivot defined by pivot pins 72A and 72B. Fixedly secured at the transverse midpoint of the beam 100 by welding or other suitable means is a clevis 102 which rotatably receives a stub shaft 104 between its two parallel members. The stub shaft 104 is in turn fixedly secured to a piston rod 106 which extends from a hydraulic cylinder 108 disposed centrally and longitudinally along the top of the vacuum chamber 12. The end of the hydraulic cylinder 108 remote from the door assembly 10 and piston rod 106 is pivotally secured to the wall 14 of the vacuum chamber 12 by a suitable and conventional pivot and bracket assembly 110. The hydraulic cylinder 108 is of a conventional, double-acting type and is thus capable of extending and retracting the piston rod 106 in response to the appropriate application and release of pressurized hydraulic fluid. As the piston rod 106 extends and retracts, rotating the pair of crank arm assemblies 40A and 40B about the axis of pivot defined by the pivot pins 72A and 72B, the pivot and clevis assembly 110 permits angular repositioning of the hydraulic cylinder 108 as necessary. As is apparent from FIG. 1, the clevis 102 is angularly positioned relative to the second crank arms 44A and 44B at a small acute angle such that the piston rod 106, the pivot pin 104 and the beam 100 are all disposed along a common, horizontal axis when the door 30 is in its closed position.

As noted previously, the assembly generally illustrated in FIG. 4 is but the right half of a mirror-image pair of crank arm assemblies 40A and 40B. The left crank arm assembly 40B thus likewise includes a strut assembly 90B as illustrated in FIG. 3.

Figure 5:
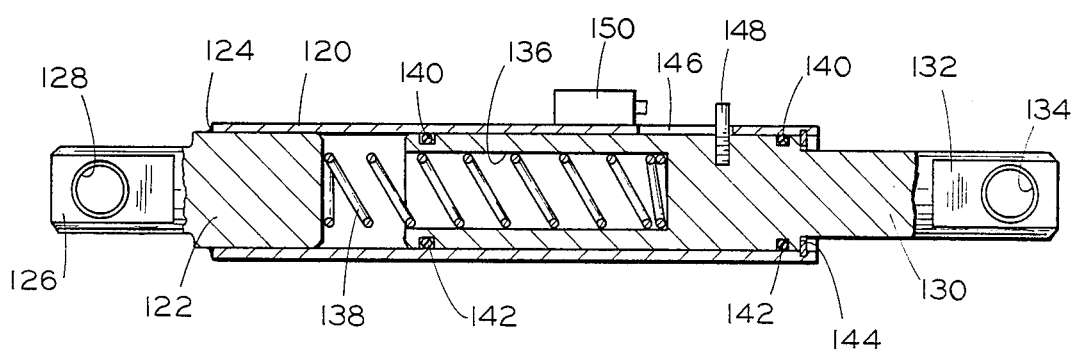
FIG. 5 is a full, sectional view of a vacuum cooler door spring stabilizer assembly according to the instant invention taken along line 5—5 of FIG. 2.

Referring now to FIG. 5, it should be understood that the basic guiding function of the strut assemblies 90A and 90B can be accomplished by utilizing rigid, fixed length struts. Incorporation and utilization of simple rigid links is therefore comprehended by the instant disclosure. Certain features and advantages, however, are enjoyed if the strut assemblies 90A and 90B are spring loaded and one of the pair of such spring loaded strut assemblies, the assembly 90A, will now be described. The strut assembly 90A preferably includes a cylindrical housing 120 to which an end plug 122 is secured by means such as a weldment 124 or other suitable fastening means. The end plug 122 includes a lug portion 126 defining an aperture 128 through which one of the threaded fasteners 86A or 92A is received. Slidably disposed within the cylindrical housing 120 is a piston member 130 having a lug portion end 132 which likewise defines an opening 134 for receiving the other of the threaded fasteners 86A or 92A. The piston member 130 defines a chamber 136 which receives a compression spring 138 disposed between the end, radial face of the chamber 136 and the radial face of the end plug 122. The piston structure 130 likewise preferably includes a pair of channels 140 which receive appropriately sized O-rings 142. The O-rings 142 damp and smooth the motion of the piston structure 130 within the cylindrical housing 120. A retaining ring 144, seated in a suitable circumferential channel in the inner wall of the housing 120 retains the piston member 130 therein. The cylindrical housing 120 also includes an axially extending elongate slot 146 which receives a radially disposed pin 148 secured to the piston member 130. Registration of the pin 148 within the elongate slot 146 not only limits the axial extent of translation of the piston member 130 relative to the end plug 122 but also provides an indication of the extent of such compression. Such indication may be useful to activate a switch 150 or other signalling device that the door 30 has encountered an obstruction during its operation.

Operation of the door is generally illustrated in FIGS. 1, 2 and 3. In FIG. 1, the piston 106 is in its fully extended position from the cylinder 108 and the door 30 is closed. Upon application of pressurized hydraulic fluid to the internal portion of the hydraulic cylinder 108 most proximate the door assembly 10, the piston rod 106 will commence retraction into the cylinder 108 and the door will begin to open. FIG. 2 illustrates the position of the door in approximately its half open condition. It will be appreciated that the orientation and positioning of the door as it moves from its closed to open position requires a minimum of rearward and upward space. For example, a loading dock 150 diagrammatically illustrated in FIGS. 1 and 2 is shown relatively proximate the end of the vacuum chamber 12. The dashed line 152, illustrated in FIG. 2, indicates the arc of travel of the lower portion of the peripheral flange 32 of the door 30 as it traverses from its fully closed position to the position illustrated in FIG. 2. It should be appreciated that the compound pivoting motion of the door 30 minimizes aft clearance required between the end of the vacuum chamber assembly 12 and any fixed objects such as the loading dock 150 when compared to a door design having, for example, but a single horizontal pivot disposed tangent with the upper marginal edge of the vacuum chamber door. In a like manner, the door assembly 10 according to the instant invention requires substantially less vertical headroom or clearance than prior art designs as it moves from its fully closed to fully open position. As FIG. 2 illustrates, the door 30 relatively closely clears the upper edge of the flange 34 of the vacuum chamber 12 and in its fully open position, is substantially horizontal. The door 30 is illustrated in FIG. 3 in its fully open position.

It should therefore be appreciated that the opening and closing path of the door 30 determined by the two horizontal, parallel axes defined by the pivot pins 48A, 48B and 72A and 72B and the two parallel axes defined by the ends of the strut assemblies 90A and 90B, that is, the pivot pins 86A and 86B and 92A and 92B, not only permits operation of the door 30 in significantly reduced rearward and upward space, but also carefully controls the motion of the door and eliminates brief, uncontrolled motion of the door as it passes a point of its traverse where its center of gravity shifts from one side of the sliding pivot to the other as is common with prior art designs. Furthermore, the pivot and bearing assemblies 54A and 54B, including as they do, large thrust bearing surfaces, stabilize and reduce to negligible levels any angular oscillation, chatter or uneven left and right opening and closing of the door 30 which, again, is a problem common to many prior art designs. Lastly, the utilization of but a single hydraulic cylinder drive assembly disposed in the transverse middle of the overall assembly, further ensures balanced and even opening and closing of the door 30.

The foregoing disclosure is the best mode devised by the inventor for practicing this invention. It is apparent, however, that apparatus incorporating modifications and variations will be obvious to one skilled in the art of door mechanisms. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

What is claimed is:

1. A door assembly for providing access to a chamber comprising, in combination, a door, a pair of crank arm assemblies, each of said pair of crank arm assemblies having a first arm, a centrally disposed pivot and a second arm, said first arm of said pair of crank assemblies pivotally secured to said door along a first axis, said pair of crank arm assemblies supported at said centrally disposed pivots for motion about a second axis parallel to said first axis, means for coupling said second arms of said pair of crank assemblies, means for moving said pair of crank assemblies about said second axis and a pair of links pivotally secured to said door at points along a third axis parallel to said first axis and extending to a fourth axis adjacent and parallel to said second axis.

2. The door assembly of claim 1 wherein said first axis and said third axis are disposed in fixed relationship to one another.

3. The door assembly of claim 1 wherein said second axis and said fourth axis are disposed in fixed relationship to one another.

4. The door assembly of claim 1 further including bearing means disposed adjacent said centrally disposed pivot for stabilizing movement of said pair of crank arm assemblies about said second axis.

5. The door assembly of claim 4 wherein said bearing means includes a pair of adjacent structures having planar opposed surfaces disposed normal to said first axis.

6. The door assembly of claim 1 wherein said means for moving said pair of crank arm assemblies includes a hydraulic piston and cylinder assembly operatively coupled to said means for coupling said second arms.

7. The door assembly of claim 1 wherein said links are compressible and include a pair of spaced apart ends and a compression spring operatively disposed between said ends.

8. The door assembly of claim 7 further including means for sensing compression of said compression spring.

9. A door assembly for providing access to a chamber comprising, in combination, a door, a pair of crank arms having a respective pair of centrally disposed pivots, a respective first pair of ends and a respective second pair of ends, said first pair of ends pivotally secured to said door along a first axis, said crank arms supported at said pair of centrally disposed pivots for motion about a second axis parallel to said first axis, means for coupling said pair of crank arms, means for moving said pair of crank arms about said second axis and a pair of links pivotally secured to said door at points along a third axis parallel to said first axis and extending to a fourth axis adjacent and parallel to said second axis.

10. The door assembly of claim 9 wherein said first axis and said third axis are disposed in fixed relationship to one another.

11. The door assembly of claim 9 wherein said second axis and said fourth axis are disposed in fixed relationship to one another.

12. The door assembly of claim 9 wherein said bearing means includes a pair of adjacent structures having planar opposed surfaces disposed normal to said first axis.

13. The door assembly of claim 9 wherein said means for moving said pair of crank arm assemblies includes a hydraulic piston and cylinder assembly operatively coupled to said means for coupling said second arms.

14. The door assembly of claim 9 wherein said links are compressible and include a pair of spaced apart ends and a compression spring operatively disposed between said ends.

15. A door assembly for providing access to a chamber comprising, in combination, a chamber having sidewalls, a door, a pair of crank arms, each of said crank arms having a centrally disposed pivot, a first end spaced from said pivot and a second end spaced from said pivot, said first pair of ends pivotally secured to said door along a first axis, bearing means secured to said sidewalls of said chamber for supporting said pair of crank arms at said centrally disposed pivots for motion about a second axis parallel to said first axis, said bearing means including pairs of opposed bearing plates disposed normal to said second axis means extending along a third axis parallel to said first axis for coupling said second pairs of ends, means coupled to said just recited means for moving said pair of crank arms about said second axis and a pair of links pivotally secured to said door at points along a fourth axis parallel to said first axis and extending to a fifth axis adjacent and parallel to said second axis.

16. The door assembly of claim 15 wherein said first axis and said fourth axis are disposed in fixed relationship to one another.

17. The door assembly of claim 15 wherein said second axis and said fifth axis are disposed in fixed relationship to one another.

18. The door assembly of claim 15 wherein said links are compressible and include a pair of spaced apart ends and a compression spring operatively disposed between said ends.

19. The door assembly of claim 18 further including means for sensing compression of said compression spring.

* * * * *